United States Patent
Awad et al.

(10) Patent No.: US 9,231,662 B2
(45) Date of Patent: Jan. 5, 2016

(54) SECURE COMMUNICATIONS VIA NFC DEVICE

(71) Applicant: Broadcom Corporation, Irvine, CA (US)

(72) Inventors: Mohamed Awad, Ladera Ranch, CA (US); Brima Ibrahim, Laguna Hills, CA (US); John Waters, Bath (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/497,692

(22) Filed: Sep. 26, 2014

(65) Prior Publication Data

US 2015/0011162 A1 Jan. 8, 2015

Related U.S. Application Data

(63) Continuation of application No. 13/172,325, filed on Jun. 29, 2011, now Pat. No. 8,874,038.

(51) Int. Cl.
*H04B 5/00* (2006.01)
*H04W 76/02* (2009.01)
(Continued)

(52) U.S. Cl.
CPC ............ *H04B 5/0031* (2013.01); *H04B 5/02* (2013.01); *H04L 69/24* (2013.01); *H04W 76/023* (2013.01); *H04L 67/2842* (2013.01); *H04W 4/008* (2013.01)

(58) Field of Classification Search
USPC ............ 455/41.1, 457, 566, 956, 556.1, 66.1, 455/145, 151.2, 158.4, 154.2, 426.1; 370/338, 252, 255, 342, 344
See application file for complete search history.

(56) References Cited

U.S. PATENT DOCUMENTS 6,311,042 B1 * 10/2001 DeSchrijver ........ G06F 3/03545
340/5.52
8,316,237 B1 * 11/2012 Felsher ................. H04L 9/0825
380/282

(Continued)

FOREIGN PATENT DOCUMENTS

CN          1914858 A    2/2007
CN        101496006 A    7/2009
(Continued)

OTHER PUBLICATIONS

Office Action for Chinese Patent Application No. 201210227002.5. mailed on Apr. 29, 2014.

(Continued)

*Primary Examiner* — Ganiyu A Hanidu
(74) *Attorney, Agent, or Firm* — Sterne, Kessler, Goldstein & Fox P.L.L.C.

(57) ABSTRACT

A system, method, and apparatus for negotiating a communication link between first and second near field communication (NFC) devices is disclosed. A third NFC device is placed in close proximity with a first host device operatively containing the first NFC device to determine communication information including at least one of a communication mechanism and a data transfer protocol usable by the first host device. The communication information usable by the first host device is stored in a portable device operatively containing the third NFC device. The third NFC device is momentarily placed in close proximity with the second NFC device. The stored communication information of the first host device is transferred from the portable device to a second host device operatively containing the second NFC device. A communication link is established between the first and second host devices to enable the first and second host devices to transfer data between them as a function of the determined communication information.

23 Claims, 4 Drawing Sheets

(51) Int. Cl.
  *H04L 29/06* (2006.01)
  *H04B 5/02* (2006.01)
  *H04W 4/00* (2009.01)
  *H04L 29/08* (2006.01)

(56) References Cited

U.S. PATENT DOCUMENTS

| | | |
|---|---|---|
| 8,466,790 B2 | 6/2013 | Palin et al. |
| 8,818,276 B2 * | 8/2014 | Kiukkonen ............ H04L 63/107 455/41.1 |
| 2007/0263596 A1 | 11/2007 | Charrat |
| 2008/0077969 A1 * | 3/2008 | Okada ................... H04N 5/4401 725/151 |
| 2009/0111378 A1 | 4/2009 | Sheynman et al. |
| 2009/0174525 A1 | 7/2009 | Yamauchi |
| 2010/0075666 A1 | 3/2010 | Garner |
| 2010/0081385 A1 | 4/2010 | Lin et al. |
| 2010/0082136 A1 * | 4/2010 | Rosenblatt ........ G06F 17/30058 700/94 |
| 2010/0082481 A1 | 4/2010 | Lin et al. |
| 2010/0091198 A1 | 4/2010 | Matsuo |
| 2010/0178868 A1 | 7/2010 | Charrat |
| 2010/0227553 A1 | 9/2010 | Charrat et al. |
| 2012/0099566 A1 * | 4/2012 | Laine .................. H04M 1/7253 370/338 |
| 2012/0238207 A1 * | 9/2012 | Marcovecchio .... H04L 63/0492 455/41.1 |
| 2012/0326847 A1 | 12/2012 | Strauman |
| 2013/0005246 A1 | 1/2013 | Waters et al. |
| 2013/0045680 A1 | 2/2013 | Dua |

FOREIGN PATENT DOCUMENTS

| | | |
|---|---|---|
| CN | 101843124 A | 9/2010 |
| WO | WO 2009/013385 A1 | 1/2009 |

OTHER PUBLICATIONS

International Standard ISO/IEC 18092:2004(E), "Information Technology—Telecommunications and Information Exchange Between Systems—Near Field Communication—Interface and Protocol (NFCIP-1)," Published on Apr. 1, 2004.

International Standard ISO/IEC 21481:2005(E), "Information Technology—Telecommunications and Information Exchange Between Systems—Near Field Communication—Interface and Protocol-2 (NFCIP-2)," Published on Jan. 15, 2005.

European Search Report for Application No. EP 12 00 4780, The Hague, Netherlands, mailed on Oct. 1, 2013, 6 pages.

* cited by examiner

SECURE COMMUNICATIONS VIA NFC DEVICE

CROSS-REFERENCE TO RELATED APPLICATIONS

This application is a continuation of U.S. patent application Ser. No. 13/172,325, filed Jun. 29, 2011, now U.S. Pat. No. 8,874,038, which is incorporated herein by reference for all purposes.

BACKGROUND

1. Field of the Invention

The present invention relates generally to near field communications.

2. Background Art

Near field communication, or NFC, is a set of short-range wireless technologies, typically requiring a distance of 4 cm or less. NFC generally operates at 13.56 MHz and at rates ranging from about 106 kbit/s to 848 kbit/s. NFC always involves a reader (or initiator) and a tag (or target), the reader actively generates an RF field that can power a passive tag. This enables NFC tags to be configured so as to have very simple form factors such as tags, stickers, key fobs, or cards that do not require batteries. NFC peer-to-peer communication is of course possible, where both devices are powered. Devices that contain both reader and tag capabilities are called controllers.

Near field communications (NFC) devices can be integrated into mobile devices, such as smartphones, for example, to facilitate the use of these mobile devices in conducting daily transactions. For example, instead of carrying numerous credit cards, the credit information provided by these credit cards could be stored onto a NFC device. The NFC device is simply tapped to a credit card terminal to relay the credit information to it to complete a transaction. As another example, ticket writing systems, such as those used in bus and train terminals, may simply write ticket fare information onto the NFC device instead of providing a ticket to a passenger. The passenger simply taps the NFC device to a reader to ride the bus or the train without the use of a paper ticket.

Generally, NFC requires that NFC devices be present within a relatively close proximity to each other so that their corresponding magnetic fields can exchange information. Typically, a first NFC device transmits or generates a magnetic field modulated with the information, such as the credit information or the ticket fare information. This magnetic field inductively couples onto a second NFC device that is proximate to the first NFC device. The second NFC device may respond to the first NFC device by transmitting or generating its own modulated magnetic field and inductively coupling this magnetic field to the first NFC device.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION

Figure 1:
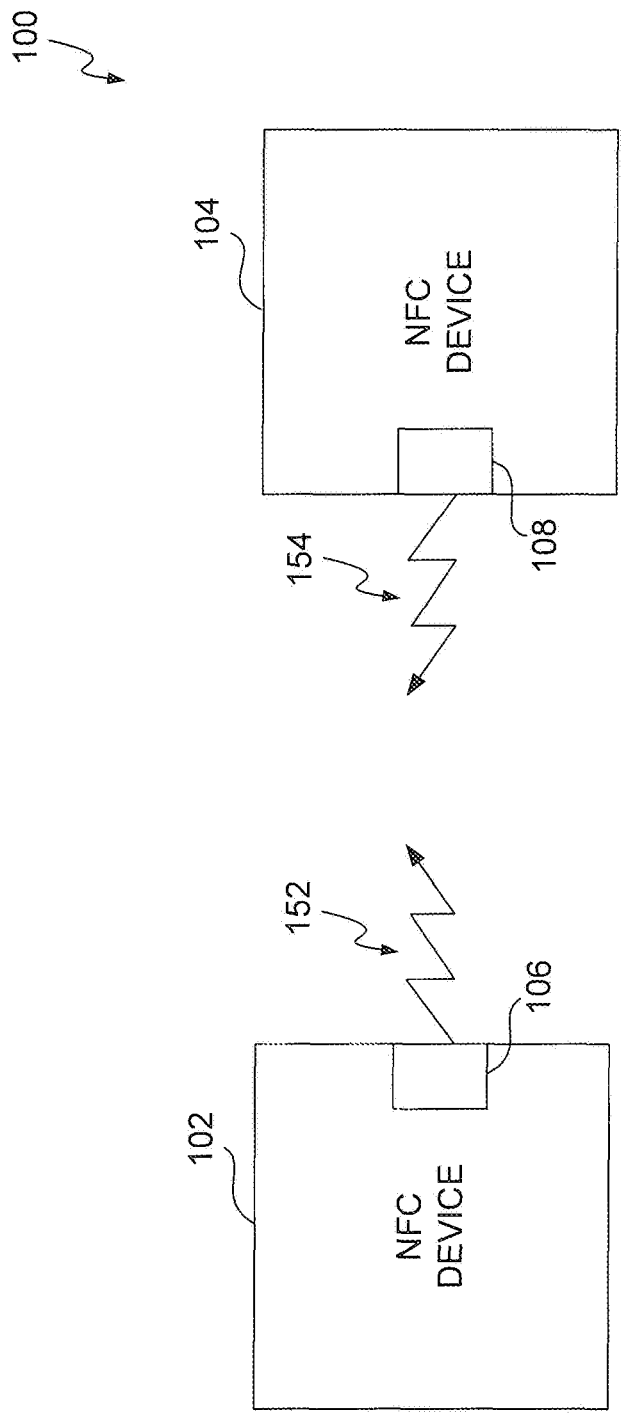
FIG. 1 shows a block diagram of an NFC environment.

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although, the description of the present invention is to be described in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

FIG. 1 illustrates a block diagram of a NFC environment according to an exemplary embodiment of the invention. A NFC environment 100 provides wireless communication of information among a first NFC device 102 and a second NFC device 104 that are closely proximate to each other (typically between 0 cm and 4 cm spacing). The information may include one or more commands to be executed by the first NFC device 102 and/or the second NFC device 104, data from one or more data storage devices that is to be transferred to the first NFC device 102 and/or the second NFC device 104, or any combination thereof. The data storage devices may include one or more contactless transponders, one or more contactless tags, one or more contactless smartcards, or any other machine-readable media that will be apparent to those skilled in the relevant art(s) without departing from the spirit and scope of the invention, or any combination thereof. The other machine-readable media may include, but are not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples.

NFC devices 102 and 104 may be any of three types of devices. One type is a tag, or target. A tag is passive. A tag contains data or commands. When brought into communication with another device, the tag transfers data or commands to the second device. As one example, a tag may be an ID card that permits access to a building when the data stored on the tag is read. A second type is a reader, or initiator. A reader generates an electromagnetic field which is modulated by a tag. An example of a reader may be the unit mounted on the building wall that reads the information stored in the tag. The reader reads data stored on the tag and may take action based on the received information. A controller is a device that incorporates features of both a tag and a reader. Thus a controller may act as a tag, or a reader, or both. For purposes of the present disclosure, a tag, a reader, and a controller will be referred to herein individually and collectively as a "NFC device."

The first NFC device 102 and/or the second NFC device 104 may be implemented as a standalone or a discrete device or may be incorporated within or coupled to larger electrical devices or host devices such as mobile telephones, portable computing devices, other computing devices such as personal, laptop, tablet, or desktop computers, computer peripherals such as printers, portable audio and/or video players, television receivers, a payment system, ticket writing systems such as parking ticketing systems, bus ticketing systems, train ticketing systems or entrance ticketing systems to provide some examples, or in ticket reading systems, toys, games, posters, packaging, advertising materials, product inventory checking systems and/or any other suitable electronic device that will be apparent to those skilled in the relevant art(s) without departing from the spirit and scope of the invention.

The first NFC device 102 and/or the second NFC device 104 interact with each other to exchange information such as data and/or one or more commands to be executed by the first NFC device 102 and/or the second NFC device 104. Each NFC device 102 and 104 contains an antenna 106 and 108, respectively, to enable NFC devices 102 and 104 to communicate with each other. One example of such communications is a peer (P2P) communications mode or a reader/writer (R/W) communications mode. In the P2P communications mode, the first NFC device 102 and the second NFC device 104 may be configured to operate according to an active communications mode and/or a passive communications mode. The first NFC device 102 modulates first information onto a first carrier wave, referred to as a modulated data communication, and generates a first magnetic field by applying the modulated data communications to the first antenna 106 to provide a first data communications 152. The first NFC device 102 ceases to generate the first magnetic field after transferring the first information to the second NFC device 104 in the active communications mode via the second antenna 108. Alternatively, in the passive communications mode, the first NFC device 102 continues to apply the first carrier wave without the first information, referred to as an unmodulated data communication, to continue to provide the first data communications 152 once the first information has been transferred to the second NFC device 104.

In a communication mode, the first NFC device 102 is sufficiently closely proximate to the second NFC device 104 that the first data communications 152 is inductively coupled onto the second antenna 108 of the second NFC device 104. The second NFC device 104 demodulates the first data communications 152 to recover the first information. The second NFC device 104 may respond to the first information by modulating second information onto a second carrier wave and generating a second magnetic field by applying this modulated data communications to the second antenna 108 to provide a second modulated data communications 154 in the active communications mode. Alternatively, the second NFC device 104 may respond to the first information by modulating the first carrier wave that is inductively coupled onto the second antenna 108 with the second information to provide the second modulated data communications 154 in the passive communications mode.

In the R/W communications mode, the first NFC device 102 is configured to operate in an initiator, or reader, mode and the second NFC device 102 is configured to operate in a target, or tag, mode. This example is not limiting. Those skilled in the relevant art(s) will recognize that the first NFC device 102 may be configured to operate in the tag mode and the second NFC device 104 may be configured to operate in the reader mode in accordance with the teachings herein without departing from the spirit and scope of the present invention. The first NFC device 102 modulates the first information onto the first carrier wave and generates the first magnetic field by applying the modulated data communications to the first antenna 106 to provide the first data communications 152. The first NFC device 102 continues to apply the first carrier wave without the first information to continue to provide the first data communications 152 once the first information has been transferred to the second NFC device 104. The first NFC device 102 is sufficiently closely proximate to the second NFC device 104 that the first data communications 152 is inductively coupled onto the second antenna 108 of the second NFC device 104.

The second NFC device 104 derives or harvests power from the first data communications 152 to recover, to process, and/or to provide a response to the first information. The second NFC device 104 demodulates the first data communications 152 to recover the first information. The second NFC device 104 processes the first information. The second NFC device 104 may respond to the first information by modulating the second information onto the second carrier wave and generating the second magnetic field by applying this modulated data communications to the second antenna 108 to provide the second modulated data communications 154.

Further operations of the first NFC device 102 and/or the second NFC device 104 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

Devices that transfer data between them using NFC capabilities are known. However, such devices to date only operate within a given operating system, such as where the two devices have a known IP address and the protocols for transferring data between them are known. A feature of the present disclosure is that data transfer can take place between devices that have multiple protocols and/or data transfer mechanisms available to them.

Figure 2:
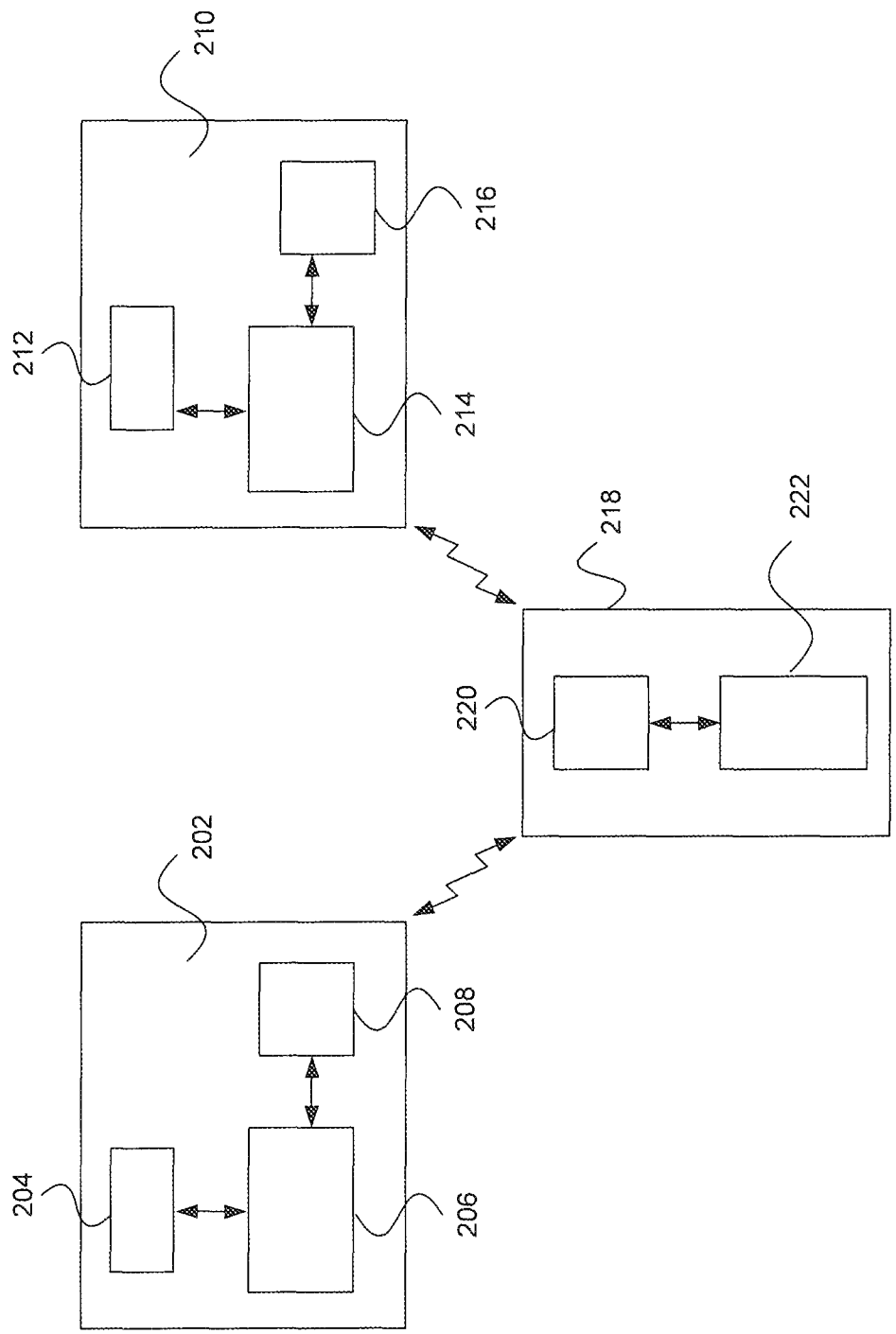
FIG. 2 shows an exemplary embodiment of the NFC communications system described herein.

FIG. 2 shows an embodiment in which two NFC devices communicate with each other through a third, intermediary NFC device. A first host device 202 contains within it operating equipment 204, including, but not limited to one or more processors, memory, either temporary or permanent or both, a display, if appropriate, and any other operating equipment suitable for that host device. Host device 202 may be any number of devices, such as, but not limited to, a desktop, laptop, or tablet computer, a mobile phone, a television receiver, a video or audio recorder, or any other device capable of recording and/or displaying audio and/or video data A communications module 206 is incorporated into host device 202. Communications module 206 can have any one or more of dial-up, Ethernet, WiFi, Bluetooth, cable modem, 3G, 4G, or any other communication capability that allows host device 202 to communicate with one or more other host devices. Associated with the communication mechanisms available to first host device 202, are the protocols available to the first host device, including, but not limited to, an IP address, and signaling, authentication and error detection and correction capabilities.

Host device 202 contains data to be transferred. The data includes context specific information, such as, but not limited to, whether the data is a photo, a document (including the type of document), a video, etc. The context specific information can include the size of the data file to be transferred, and any other metadata associated with the data file that would be needed to reproduce the data file on a second device. The information about the communication mechanisms, protocols, and data context specific information of first host device 202 is collectively referred to as the "first host device information."

A NFC module 208 is incorporated into host device 202 in communication with communications module 206. NFC module 208 may also be operatively connected to operating equipment 204, particularly to a processor and/or memory thereof NFC module 208 stores the first host device information from communications module 206 and operating equipment 204, as needed, for transfer to other devices, as will be made clear below.

FIG. 2 also shows a second host device 210. Host device 210 may be any number of devices, such as, but not limited to, a desktop, laptop, or tablet computer, a mobile phone, a television receiver, a video or audio recorder, or any other device capable of recording and/or displaying audio and/or video data. Host device 210 contains within it operating equipment 212, including, but not limited to, one or more processors, memory, either temporary or permanent or both, a display, if appropriate, and any other operating equipment suitable for that host device. A communications module 214 is incorporated into host device 210. Communications module 214 can have any one or more of dial-up, Ethernet, WiFi, Bluetooth, cable modem, 3G, 4G, or any other communication capability that allows host device 210 to communicate with one or more other host devices. Associated with the communication mechanisms available to second host 210, are the protocols available to the second host, including, but not limited to, an IP address, and signaling, authentication and error detection and correction capabilities. These communication capabilities of second host device 210 are collectively referred to as "second host device information." A NFC module 216 is incorporated into host device 210 in communication with communications module 214. NFC module 216 may also be operatively connected to operating equipment 212, particularly to a processor and/or memory thereof.

A portable device 218 is intended to communicate with host devices 202 and 210. Portable device 218 may be, but is not limited to, a mobile smartphone, or a laptop or tablet computer. Portable device 218 may be any device that is capable of being carried or otherwise moved between host devices, such as host devices 202 and 210, incorporating the first and second NFC devices 208 and 216, respectively. Portable device 218 contains operating equipment 220, including, but not limited to one or more processors, memory, either temporary or permanent or both, a display, if appropriate, and any other operating equipment suitable for portable device 218. A third NFC device 222 is incorporated into portable device 218. NFC device 222 is operatively connected to operating equipment 220, and particularly a processor and memory thereof. The third NFC device 222 is used as an intermediary to convey information between the first and second NFC devices 208 and 216, respectively.

Figure 3:
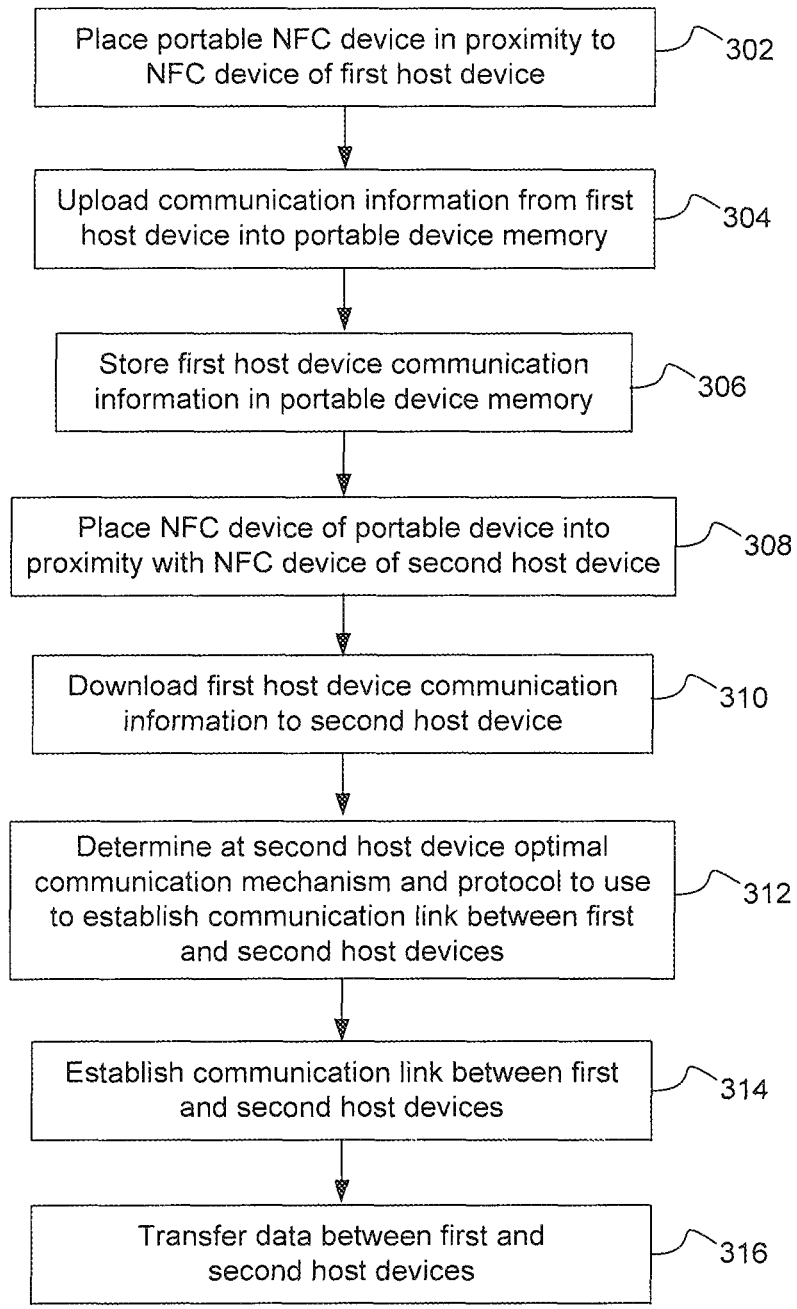
FIG. 3 is a flow chart showing the operation of a first embodiment of the NFC communication system described herein.

FIG. 3 is a flow chart of the steps involved in a first embodiment. In step 302, portable device 218 containing third NFC device 222 is initially brought into close proximity with or into contact with first NFC device 208 in first host device 202. At step 304, first NFC device 208 incorporated into first host device 202 transfers (or uploads) the first host device communication information to portable device 218 via third NFC device 222. More particularly, first NFC device 208 transfers information about the communication mechanisms incorporated into first host device 202, such as whether host device 202 can communicate via dial-up, hard-wire, Ethernet, WiFi, Bluetooth, cable modem, 3G, 4G, etc. Further first NFC device 208 transfers all of the protocols that it obtains from communications module 206 and/or operating equipment 204, such as, but not limited to, an IP address, and signaling, authentication and error detection and correction capabilities. Still further NFC device 208 transfers context specific information about the data to be transferred.

At step 306, portable device 218 stores the first host device communication information received from first NFC device 208 in memory of operating equipment 220. The memory can be permanent or temporary storage, such as Random Access Memory (RAM) or Read Only Memory (ROM), or any suitable variation thereof. Portable device 218 may have a mechanism (not shown) to automatically or manually erase the first host device information from storage in operating equipment 220 after it has served its purpose.

At step 308, after portable device 218 has stored the first host device communication information, third NFC device 222 is brought into close proximity with or into contact with second NFC device 216. In one embodiment, at step 310, second NFC device 216 transfers or downloads the first host device communication information from portable device 218 to second host device 210. At step 312, second host device 210 compares the first host device communication information to its own communication capabilities and selects the most appropriate communication mechanism and protocol to be used to transfer data from first host device 202 to second host device 210. At step 314, second host device 210 establishes a communication link with first host device 202 using the selected communication mechanism and protocol. At step, 316, data is transferred between the first host device 202 and second host device 210.

As one non-limiting example, suppose first host device 202 has the capability to communicate via an Ethernet link, a WiFi link, and a Bluetooth link. Further suppose that the data to be transferred includes a video clip. Next suppose that second host device 210 is only capable of communicating over a 3G modem connection. Portable device 218 uploads the first host device information, (e.g., including communications capabilities, protocols, and data context specific information) from first host device 202 via the communication between first NFC device 208 and third NFC device 222. Portable device 218 then downloads the first host device information to second host device 210 via the communication between third NFC device 222 and second NFC device 216. Second host device 210 compares the downloaded first host device information with its own communication capability and determines that first host device 202 has an Ethernet link. Second host device 210 then uses its 3G modem connection to go out to the Ethernet with the IP address of first host device 202 (which was included in the first host device information) and establishes a communication link with first host device 202 over the Internet to enable first host device 202 to transfer the data (e.g., the video clip) to second host device 210 to be used by second host device 210.

Figure 4:
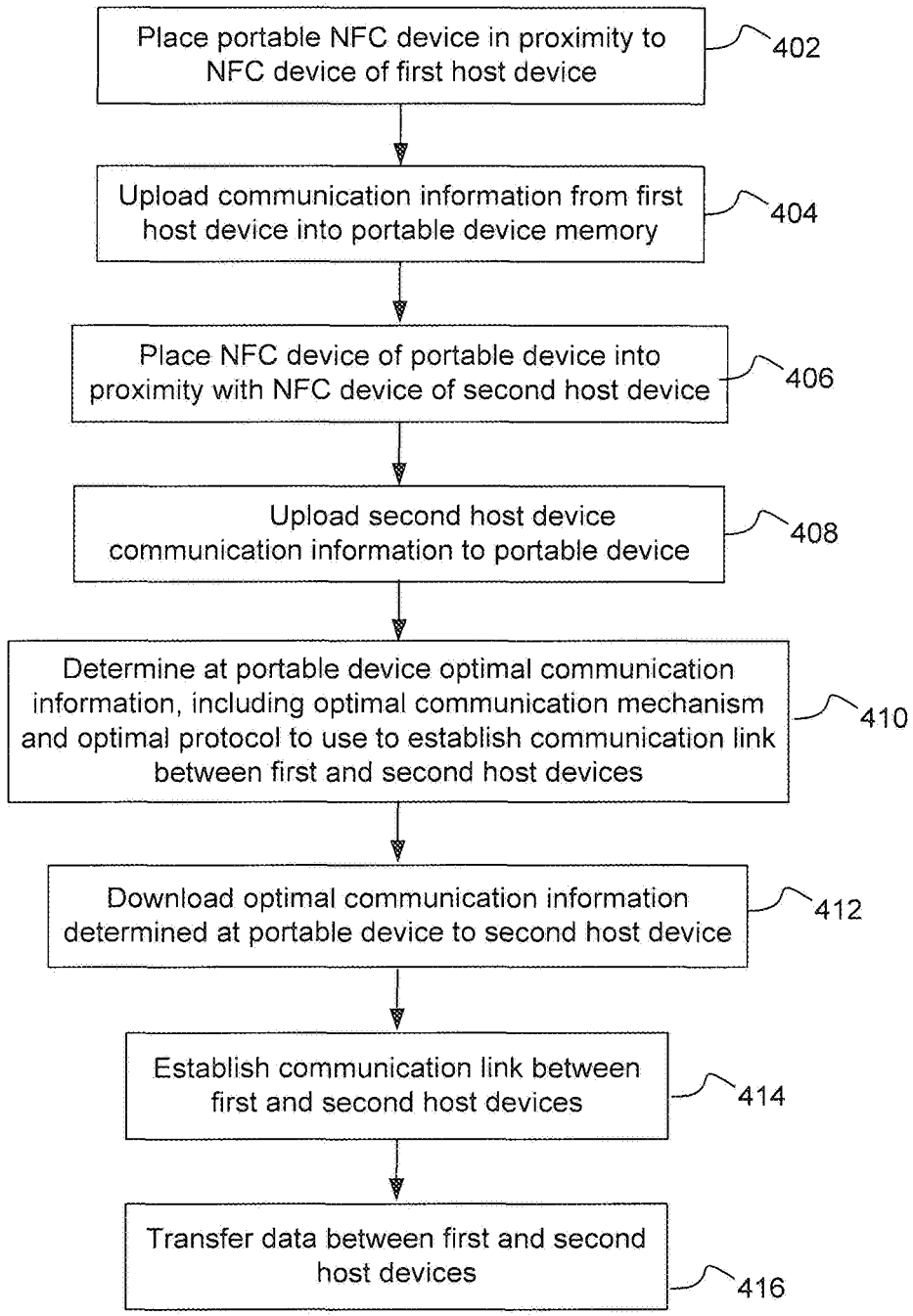
FIG. 4 is a flow chart showing the operation of a second embodiment of the NFC communication system described herein.

FIG. 4 is a flow chart of a second embodiment. At step 402, third NFC device 222 is brought into proximity with first NFC device 208. At step 404, the first host device communication information is uploaded to portable device 218 and stored in memory of portable device 218. At step 406, third NFC device 222 is brought into proximity or contact with second NFC device 216. At step 408, the second host device communication information is uploaded to portable device 218. At step 410, portable device 218 compares the stored first host device communication information with the second host device communication information in its operating equipment 220 to determine the optimum communication mechanism and protocol that should be used to share data between first and second host devices 202 and 210. At step 412, portable device 218 downloads and transfers the optimal communication configuration information to second host device 210. At step 414, second host device 210 establishes a communication link with first host device 202 based on the optimal communications configuration information determined by portable device 218. At step 416, data is transferred between first host device 202 and second host device 210.

Using the example given above for the second embodiment, portable device 218 selects an Ethernet connection to be used by first and second host devices 202 and 210. Third NFC device 222 is then placed into proximity with or touched to second NFC device 216 to transfer the selected communication mechanism and protocol information to second host device 210. Second host device 210 is then able to establish a communication link with first host device 202 based on the selected communication mechanism and protocol information.

In any of the embodiments described above, it is possible that the NFC connections may require authentication as a security measure. That is, it may be desirable to require that NFC device 222 be authenticated to one or both of NFC devices 208 and 212 before data can be transmitted between first host device 202 and portable device 218 and between portable device 218 and second host device 210.

In the embodiments described above, a combination of NFC devices is used.

For example, if the third NFC device is or acts as a tag, then the first and second NFC devices must both be or act as readers. If the third NFC device is or acts as a reader, then the first and second devices must both be or act as tags. If the third NFC device is a controller, then the first and second NFC devices can be or act as readers or tags. In summary, of the two NFC devices that are in communication with each other at any one time, at least one device must act as a reader and the other device must act as a tag.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A method of negotiating a bi-directional communication link between a first device and a second device, the method comprising:

receiving, by the second device, communication information relating to a first plurality of communication mechanisms and data transfer protocols supported by the first device from a portable device while the portable device is within a communication range of the second device;

comparing, by the second device, the received communication information to a second plurality of communication mechanisms and data transfer protocols, the second plurality of communication mechanisms and data transfer protocols including one or more communication standards available to the second device for communicating signals to the first device and one or more characteristics for the signals available to the second device;

selecting, by the second device, a first communication mechanism and data transfer protocol from among the second plurality of communication mechanisms and data transfer protocols that matches a second communication mechanism and data transfer protocol from among the first plurality of communication mechanisms and data transfer protocols based upon the comparing; and establishing, by the second device, the bi-directional communication link between the first device and the second device that bypasses the portable device using the selected first communication mechanism and data transfer protocol.

2. The method of claim 1, further comprising:
transferring data between the first device and the second device using the selected first communication mechanism and data transfer protocol.

3. The method of claim 1 further comprising:
authenticating the portable device to the second device.

4. The method of claim 1, wherein the selecting comprises:
selecting the first communication mechanism and data transfer protocol to be used to transfer data from the first device to the second device.

5. The method of claim 4, further comprising:
receiving, by the second device, the data from the first device using the selected first communication mechanism and data transfer protocol.

6. The method of claim 1, wherein the second device and the portable device each comprise a near field communication (NFC) device, and wherein the receiving comprises:
receiving the communication information while the portable device is within an NFC communication range of the second device.

7. The method of claim 1, wherein the plurality of communication mechanisms one or more communication standards comprise:
a wireless communication standard.

8. The method of claim 1 wherein the communication information comprises:
an IP address of the first device;
a signaling capability of the first device;
an authentication capability of the first device;
an error detection capability of the first device; or
a correction capability of the first device.

9. A device for negotiating a bi-directional communication link, which bypasses a portable device, between the device and a second device, comprising:
a memory that stores communication information relating to a first plurality of communication mechanisms and data transfer protocols supported by the second device;
a communication interface configured to receive the communication information from the portable device; and
a processor configured to:
select a first communication mechanism and data transfer protocol from among a second plurality of communication mechanisms and transfer protocols that matches a second communication mechanism and data transfer protocol from among the first plurality of communication mechanisms and data transfer protocols based upon a comparison of the received communication information to the second plurality of communication mechanisms and data transfer protocols, the second plurality of communication mechanisms and data transfer protocols including one or more communication standards available to the second device for communicating signals to the first device and one or more characteristics for the signals available to the second device, and
establish the bi-directional communication link between the device and the second device that bypasses the portable device using the selected first communication mechanism and data transfer protocol.

10. The device of claim 9, wherein the processor is further configured to compare the communication information to the second plurality of communication mechanisms and data transfer protocols.

11. The device of claim 9, wherein the processor is further configured to authenticate the portable device to the second device.

12. The device of claim 9, wherein the communication interface is further configured to transfer data between the device and the second device using the first selected communication mechanism and data transfer protocol.

13. The device of claim 9, wherein the processor is configured to select the first communication mechanism and data transfer protocol to be used to transfer data from the device to the second device.

14. The device of claim 13, wherein the communication interface is further configured to receive the data from the device using the selected first communication mechanism and data transfer protocol.

15. The device of claim 9, wherein the communication interface comprises:
a near field communication (NFC) communication interface, and
wherein the NFC communication interface is configured to receive the communication information while the portable device is within an NFC communication range of the device.

16. A device for transferring data over a bi-directional communication link, comprising:
a communication interface configured to receive communication information relating to a first plurality of communication mechanisms and data transfer protocols supported by a second device over a second bi-directional communication link that is different from the bi-directional communication link; and
a processor configured to select a first communication mechanism and data transfer protocol from among a second plurality of communication mechanisms and transfer protocols that matches a second communication mechanism and data transfer protocol from among the first plurality of communication mechanisms and data transfer protocols based on a comparison of the received communication information to the second plurality of communication mechanisms and data transfer protocols, the second plurality of communication mechanisms and data transfer protocols including one or more communication standards available to the second device for communicating signals to the first device and one or more characteristics for the signals available to the second device,
wherein the communication interface is configured to transfer the data only between the device and the second device using the selected first communication mechanism and data transfer protocol over the bi-directional communication link.

17. The device of claim 16, wherein the communication interface comprises:
a near field communication (NFC) communication interface, and
wherein the NFC communication interface is configured to receive the communication information while the portable device is within an NFC communication range of the device.

18. The device of claim 16, wherein the processor is further configured to authenticate the portable device to the second device.

19. The device of claim 18, wherein the communication interface is configured to receive the communication information after authentication of the portable device to the second device.

20. The device of claim 16, wherein the processor is further configured to establish the bi-directional communication link between the device and the second device that bypasses the portable device.

21. The method of claim 1, wherein the selecting comprises:
   selecting the first communication mechanism and data transfer protocol that most appropriately matches the second communication mechanism and data transfer protocol.

22. The device of claim 9, wherein the processor is configured to select the first communication mechanism and data transfer protocol that most appropriately matches the second communication mechanism and data transfer protocol.

23. The device of claim 16, wherein the processor is configured to select the first communication mechanism and data transfer protocol that most appropriately matches the second communication mechanism and data transfer protocol.

* * * * *

UNITED STATES PATENT AND TRADEMARK OFFICE
CERTIFICATE OF CORRECTION

| | |
|---|---|
| PATENT NO. | : 9,231,662 B2 |
| APPLICATION NO. | : 14/497692 |
| DATED | : January 5, 2016 |
| INVENTOR(S) | : Awad et al. |

Page 1 of 1

It is certified that error appears in the above-identified patent and that said Letters Patent is hereby corrected as shown below:

IN THE CLAIMS

In column 9, line 8, replace "claim 1 further" with --claim 1, further--.
In column 9, line 29, replace "claim 1 wherein" with --claim 1, wherein--.
In column 10, lines 19-20, replace "communication (NFC) communication interface" with --communication (NFC) interface--.
In column 10, line 21, replace "NFC communication interface" with --NFC interface--.
In column 10, line 23, replace "NFC communication range" with --NFC range--.
In column 10, lines 55-56, replace "communication (NFC) communication interface" with --communication (NFC) interface--.
In column 10, line 57, replace "NFC communication interface" with --NFC interface--.
In column 10, line 59, replace "NFC communication range" with --NFC range--.

Signed and Sealed this
Twelfth Day of April, 2016

Michelle K. Lee
*Director of the United States Patent and Trademark Office*